Jan. 9, 1962 R. W. MADDOCK 3,016,061
EMERGENCY OXYGEN RELEASE SYSTEM AND COUPLING
Filed May 19, 1958 2 Sheets-Sheet 1
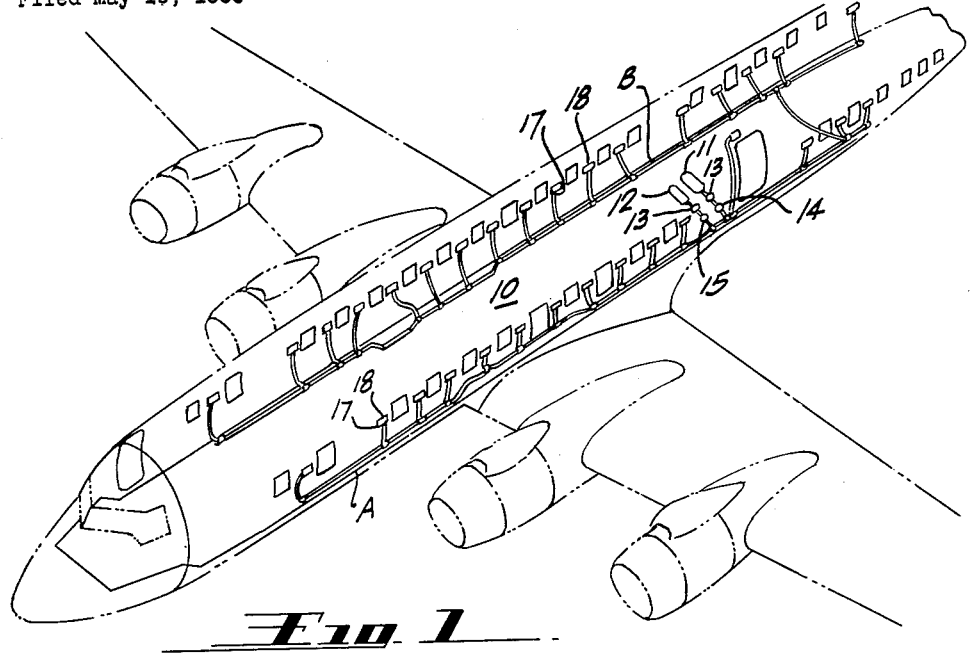
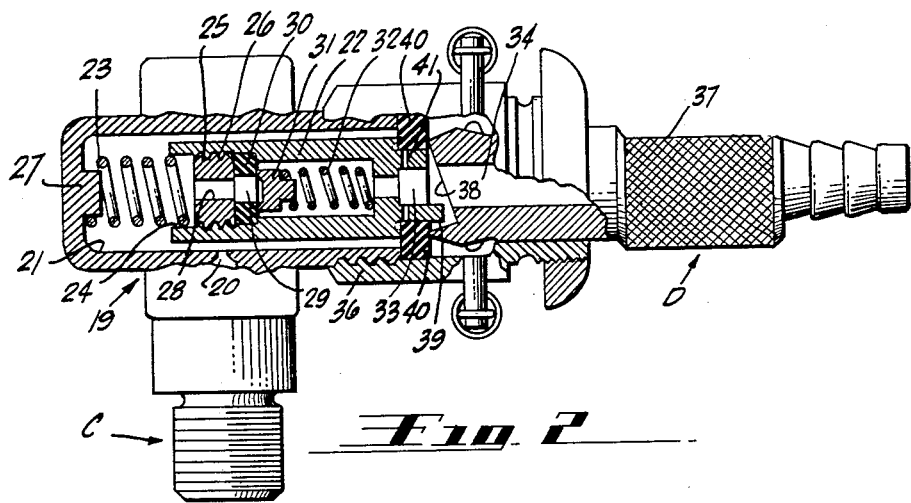
INVENTOR.
ROBERT W. MADDOCK
BY
Edwin Coates
-ATTORNEY-

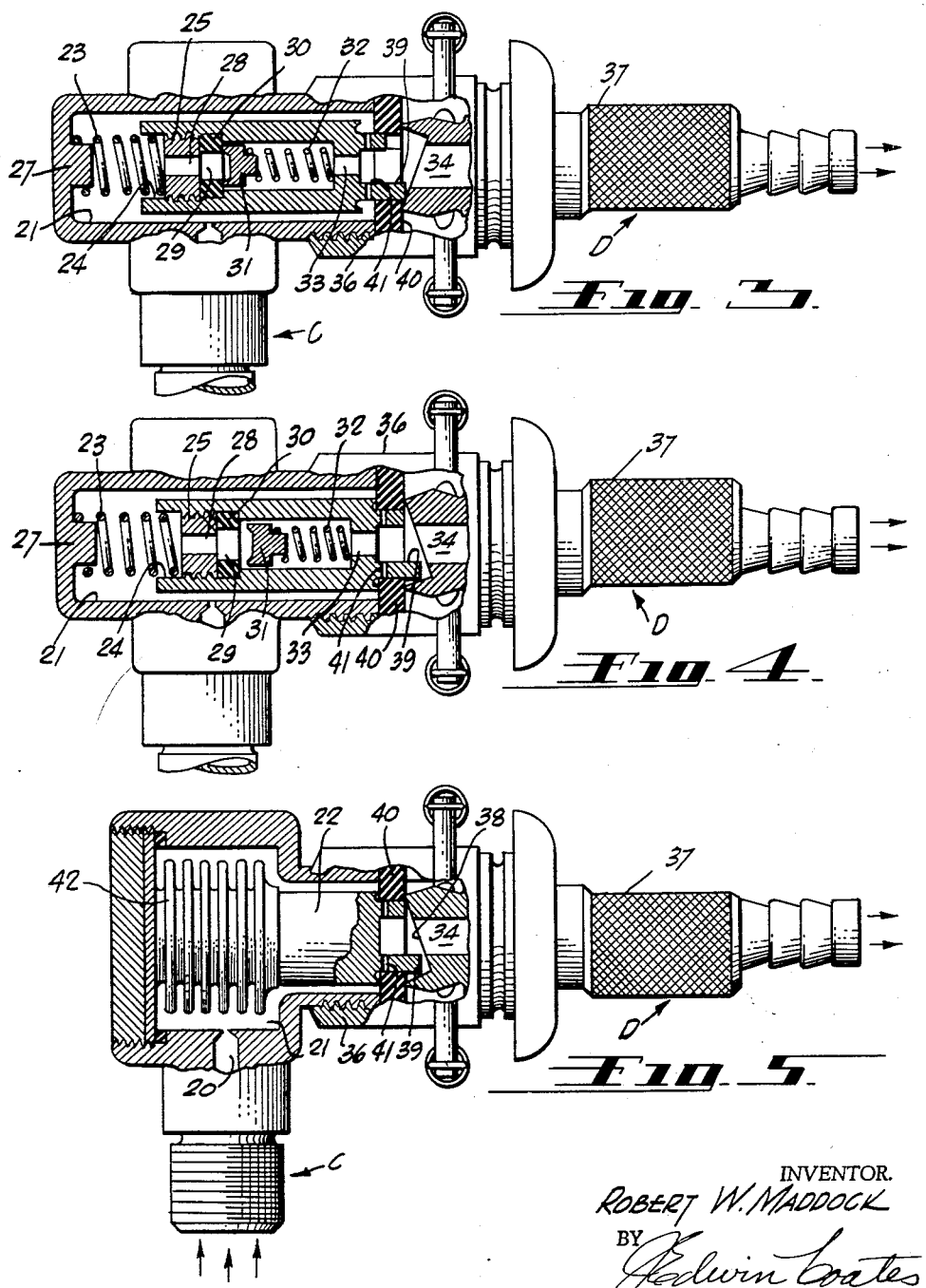

United States Patent Office

3,016,061
Patented Jan. 9, 1962

---

3,016,061
EMERGENCY OXYGEN RELEASE SYSTEM AND COUPLING
Robert W. Maddock, Pacific Palisades, Calif., assignor to Douglas Aircraft Company, Inc., Santa Monica, Calif.
Filed May 19, 1958, Ser. No. 736,242
3 Claims. (Cl. 137—81)

This invention relates to high-altitude aircraft, such as transport airplanes.

In such airplanes, the cabin is air-pressurized, but depressurization has been known to occur, because of ground-handling damage to the fuselage, engine failure, etc. One consequence is the rapid occurrence of a partial deficiency of the oxygen pressure in the cabin. At high altitudes, of the order of 45,000 feet, the passengers have only 30 seconds in which to don their oxygen masks before the onset of hypoxia and unconsciousness.

Even at low altitudes with full cabin-pressurization, however, some passengers may need their oxygen masks, not for prevention of hypoxia but for comfort or health and therapeutic purposes.

By means of the present invention a dual nature system is provided which can be manipulated at any desired passenger-station to furnish a small amount of oxygen to each passenger's mask-unit at cabin altitudes of 0–15,000 feet wherein some of the passengers may be in need of oxygen. At cabin altitudes above say 15,000 feet, it functions automatically to deliver a large amount of oxygen to any one, or more, of the passengers. The latter function is specifically designed for the resuscitation of passengers who either have failed to don their oxygen masks when advised to do so and hence are suddenly overcome by hypoxia or else even with their masks on, need more than the average amount of oxygen because of poor health, etc.

Briefly, the system consists of gas-source-means including two sources of pure oxygen located in the cabin, one of these sources of oxygen being adapted to be adjusted or manipulated to discharge oxygen at a normal rate at cabin altitudes not above 15,000 feet for example, conduitry flow-connecting said source to each of a plurality of passenger stations in the cabin; automatic flow-regulator means, of a conventional kind furnished with such oxygen-sources, the other one of these two sources including means responsive to diminution in the air pressure in the cabin altitudes above 15,000 feet, say, and operating to enable increased flow from the source toward the passenger stations; and, at each passenger station, an oxygen dispensing outlet means, or coupling between the conduitry and the mask-unit. Each of these dispensing means includes manual control means for establishing flow therethrough to the adjacent mask-unit at a first, normal rate and volume which is relatively low and obtains at cabin altitudes not above 15,000 feet by manipulating the coupling itself, as explained later; and control means for automatically establishing flow through the coupling unit aforesaid to the mask-unit at a second, or emergency rate, which is higher than the first said rate, and is employed primarily for resuscitation purposes.

The coupling unit itself is also unique and essentially consists of a compound valve that includes an elongate casing having an inlet and an outlet; a sleeve valve disposed coaxially in the casing, the sleeve having an inlet at the opposite end; means normally biasing the sleeve against the casing outlet so as to close the radial ports; and hollow, rotatable manual control means, such as a suitable hose coupling, mounted coaxially of the casing with its hollow and the sleeve hollow in registry. The inner end of said manual control means is so shaped and disposed relative to a prolongation on the one end of the sleeve valve that, upon such rotation of said manual control means as to unseat said sleeve valve, oxygen flows through said casing, sleeve, radial ports and manual means to the exterior; and means mounted coaxially in the casing in operative juxtaposition to said sleeve inlet and responsive to increase in the increased line-pressure incident to fall in cabin absolute pressure or to extreme elevation in altitude to open a passageway through said casing outlet for this emergency amount of oxygen.

The now-preferred embodiment of the system and the coupling means are illustrated in the accompanying drawings by way of example and will be described hereinafter in conjunction with said drawings.

In these drawings, FIG. 1 is a fragmentary, phantom perspective view of a high altitude transport airplane incorporating the present invention;

FIG. 2 is a view, partly in longitudinal section and partly in side elevation, of one of the control units, or couplings, of this invention, the unit being shown in the "no-flow" condition, in which condition it usually remains at cabin altitudes below, say, 15,000 feet unless it is manually opened;

FIG. 3 is a similar view thereof with the combined hose-coupling and manual control turned to open the "coupling" for normal comfort or therapeutic purposes at cabin altitudes not over 15,000 feet;

FIG. 4 is a similar view of the coupling automatically functioning to supply an emergency amount of oxygen, at cabin altitudes above 15,000 feet, and FIG. 5 is a similar view showing a modified form of the control unit or coupling.

The presently preferred embodiment of the invention, as shown in FIG. 1, is incorporated in a pressurized aircraft cabin 10, in which cabin is disposed a pair of high-pressure oxygen tanks 11 and 12 and main oxygen conduitry having a "run" A cross connected to a "run" B. The tanks 11 and 12 are connected in parallel to run A by suitable piping and each tank contains oxygen at the same high pressure, which is of the order of 1,800 p.s.i.

Tank 11 is connected to run "A" by a line including a pop-off valve 13 and a pressure regulator 14. Tank 12 is connected to run "A" by a line that includes a similar pop-off valve 13 and a somewhat different pressure regulator 15. Regulator 14 operates only at normal cabin altitude pressures and reduces the 1,800 p.s.i. tank pressure to about 15 p.s.i. for normal, therapeutic, or "comfort" use of oxygen by passengers. Regulator 15 operates only when the "cabin altitude" pressure falls, because of extreme altitude or leakage of air from the cabin, to a value below normal.

Both the regulators, 14 and 15, are of standard, well-known construction and operation and are exemplified by descriptions thereof on pages 48 and 30 of catalog #53 of the Puritan Compressed Gas Corp., Kansas City, Mo. entitled "Oxygen Breathing Equipment for Passenger and Crew." However, any other known and suitable such regulator may be employed, if desired, without departing from the scope and coverage of this invention.

In any case, each line includes a plurality of oxygen outlets 17, each outlet 17 being disposed conveniently adjacent the passenger seats.

Fitted into each outlet 17 to extend substantially fore and aft is a dual action flow controlling coupling 18. Each coupling includes control means which can be readily manually rotated, by either the passenger or the attendant, into either of two flow-controlling positions; and means for visually indicating these positions. Normally, since the airplane cruises at cabin altitudes not much above 15,000 to 20,000 feet, the coupling parts are manipulated as aforedescribed to occupy positions which unload the line at a minimum flow rate, calibrated to be sufficient to maintain the passengers in comfort, so far as oxygen requirement is concerned, at all cabin altitudes not above 15,000 feet. Since this condition maintains the health or restores the comfort of the passenger when it is established at cabin altitudes above 15,000 feet, it may reasonably be designated the "therapeutic" position or condition of the coupling. The coupling can also be adjusted, as hereinafter described, to take care of a passenger's hypoxia, an emergency condition occurring, usually, above "cabin altitudes" of 20,000 feet for most individuals, especially if de-pressurization also occurs.

In either case the coupling unit 18, in its presently preferred embodiment, comprises a cruciform main body 19, FIG. 2, having a nipple C for screwing into the adjacent outlet 17. The unit includes a portion D which is an "end fitting," more or less like a hose-coupling, and is engageable, by means of the conventional spring-loaded pins type of detent means, shown as mounted to the opposite sides of member 36, with the horizontal arm of body 19, the portion D containing rotary means, later described, that co-act with means in the main body for providing one phase of present dual pressure flow.

Body 19 includes a bore-hole 20 or port constituting a restricted oxygen inlet thereinto, 20 opening into a centrally axially disposed larger bore 21 in 19. A substantially hollow sleeve valve-body 22 is more or less floatingly mounted coaxially in bore 21, being positioned by a rightward urging coil spring 23 against a washer, or seat, 40.

The rightward end of spring 23 seats in a recess 24 defined at one end by a screw-plug 25 which is threadedly retained in a counterbore 26 in valve body 22. The opposite end of spring 23 is anchored by a boss 27 at the end of body 19.

Screw-plug 25 is provided with a central bore 28 communicating with a coaxial bore in a washer 30 seated in body 22. Washer 30 constitutes a somewhat resilient seat for a relief-valve head 31 which is resiliently retained normally closed against opening 29 by a coiled-spring 32.

An outlet bore 33 is provided in the righthand end of body 22 and bore 33 opens into a bore 34 formed in the rotatable means D, of the valve-body.

The end-fitting unit D includes a rotatable core terminating interiorly of the coupling in a camming surface 38, and unit D is fixedly secured to the righthand end of body 19 by means of a nut 36 threadedly engaged with 19 and "shouldered" to D so as to permit D's rotation thereon.

The end-fitting D can have its "insides," in which the bore 34 is formed, rotated to two discrete positions, by hand. The normal, or first, position is shown in FIGS. 2, 4 and 5, the emergency, or second position being shown in FIG. 3. A slabbed-side, or "flat," 37 serves as a visual indicator of the position of the means inside D, and when 37 is upward, as in FIGS. 2, 4 and 5 the camming surface 38 lies out of engagement from a projection 39 protruding from the rightward end of body 22. This condition obtains when the airplane is at cabin altitudes not above about 15,000 feet and, the valves 22 and 31 being then closed, as shown, no oxygen at all can pass to the passenger via the outlet 34, hose coupling hose and mask (not shown).

However, even when the cabin altitude is less than a reading of 20,000 feet, but above the aforesaid 15,000 feet of "cabin altitude" some passengers may require, in addition to that which is normally in the pressurized air in the cabin, a small amount of "pure" oxygen. This therapeutic amount may be supplied by manually rotating the core of the hose-fitting 180° from flat-side up to flat-side down, as shown in FIG. 3. This rotation turns cam 38 in such a way that the valve body 22 is, by the forward end or lobe of the cam, forced off its seat, 40. Thus, a low flow of oxygen is allowed past the loosely fitting valve body 22, through the ports 41, the latter now having been uncovered by the movement of the valve body, and thence through the passage 34 to the passenger's oxygen mask.

When the craft is at cabin altitudes above a "reading" of 15,000 feet, say, or even at 15,000 feet cabin altitude, if depressurization occurs, the coupling unit assumes the condition shown in FIG. 4. In this conditional mode of the coupling, the relief-type valve 31 is forced off its seat by the spurt of pressure from regulator 15 to supply a large volume or rate of flow of oxygen so as to enable the attendant to resuscitate a passenger who has become unconscious because of hypoxia through failure to don his mask, as when instructed to do so at cabin altitudes of about 15,000 feet. After resuscitation, of course, he will wear his mask with the valve 31 reseated by the regulator at the tank 11 and the valve body 22 functioning to supply a normal amount of oxygen.

The augmented oxygen pressure required to automatically force the valve 31 off its seat is furnished by the standard regulator 15 which automatically unseats this valve 31 in response to the diminution of pressure in the cabin consequent upon the high altitude, or decompression, as is conventional.

In FIG. 5 there is depicted a second species of the coupling of the invention, characterized by the employment of a bellows 42 for performing the functions of the spring 23, plus additional advantages. By means of the article of FIG. 5, oxygen may be automatically supplied for resuscitation purposes even when the portion bearing the flat 37 is upwardly facing. For, at such elevated cabin-altitudes, the lowering of the absolute pressure of cabin air triggers the aneroid, not shown, in the standard regulator 15 on tank 12 and augmentation of pressure throughout runs A and B occurs. The excess oxygen now trapped in chamber 21 cannot of course find exit, as through ports 41 and hence acts expansively. Since the only surface in chamber 21 that can move under this expansion is the capsule 42, containing no air, or air at a much lower pressure than that now existing in chamber 21, capsule 42 is thereby relatively collapsed, thus drawing body 22 leftwardly with it and exposing ports 41 to the flow of high pressure oxygen in chamber 21. This oxygen then flows at an emergency rate through 34, etc., to the passenger's mask.

Although in describing the preferred embodiments of the inventive concepts certain specific shapes, altitudes, pressures, etc., have been mentioned such was done only to render the inventive concepts more concrete and in no wise constitute the invention itself nor does such limit the scope of the invention unless so recited in the sub-joined claims.

I claim:

1. A system for supplying a pressurized medicinal gas at least two different rates of flow, to the personnel of an aircraft, comprising: gas source-means including means for normal supply of said gas at a low pressure; gas-flow regulator means connected to said means for supply of gas at said low pressure; said gas source-means including means responsive to a reduction in the pressure of the ambient aircraft air in which said source means is located for forwarding said gas at an increased pressure; flow control means having an outlet into the aircraft and located onwardly in the system and arranged and connected to receive both the low pressure gas and the higher pressure gas and effective to emit either low, or high, pressure gas, said flow control means including first, normally closed valve means normally connected to said means for supplying low pressure gas and to said outlet; manual means arranged to open said normally closed valve so as to pass said low pressure gas out of said outlet; automatic means responsive to the differential in pressure between that pressure which is normal in said aircraft and that pressure which exists upon decompression of said aircraft, said automatic means being automatically communicated upon decompression with said means for forwarding said gas at said increased pressure from said source means, said means responsive to said differential pressure being effective upon occurrence of said response to open a path through the flow control means to cause emission from said outlet of said gas at an elevated pressure.

2. In an aircraft having a pressurized cabin, a first source of gaseous oxygen at a first pressure; a second source of gaseous oxygen at a pressure higher than that of said first source, said second source normally being inactive; flow-regulator means respectively connected to each of said sources; a dual rate-of-flow control means connected with both of said regulator means and including an outlet communicating with a cabin; manually operable means for opening said valve to cause it to emit low pressure oxygen for therapeutic purposes; means responsive to a cabin altitude pressure reduced below a predetermined value for causing said second source to become active and supply higher pressure oxygen to said control means; said responsive means including differential pressure means connected to said outlet and to said high pressure source and responsive to the higher pressure gas from said second source so as to actuate said control means and furnish oxygen in resuscitation amounts and pressures to loci in said cabin.

3. In an aircraft having a pressurized cabin, a first source of gaseous oxygen at a first pressure; a second source of gaseous oxygen at a pressure higher than that of said first pressure; said second source normally being inactive; automatic flow regulator means connected to each of said sources, the regulator means connected to the first source being responsive to cabin altitude pressures above those existing upon decompression of said cabin and the regulator means connected to the second oxygen source being responsive only to true cabin pressures existing at decompression of the cabin; a plurality of passenger stations in the cabin; gaseous oxygen dispensing means located adjacent each passenger station, each of said dispensing means including a fluid connection to the outlet of each of the two aforesaid regulator means; each of said dispensing means including an outlet and including means for passing oxygen therethrough at two different rates, said dispensing means being normally closed; manually operable means in said dispensing means manipulatable to establish oxygen flow out of said dispensing means at a therapeutic rate; and control means in said dispensing means for automatically establishing oxygen flow out of said dispensing means at a resuscitation rate in response to decompression of said cabin.

References Cited in the file of this patent

UNITED STATES PATENTS

| | | |
|---|---|---|
| 333,139 | Long | Dec. 29, 1885 |
| 1,383,005 | Mertens | June 28, 1921 |
| 1,770,912 | Clapp | July 22, 1930 |
| 1,995,480 | Murphy | Mar. 26, 1935 |
| 1,998,239 | Irwin | Apr. 16, 1935 |
| 2,103,725 | Jacobsson | Dec. 28, 1937 |
| 2,228,315 | Hutton | Jan. 14, 1941 |
| 2,266,939 | Thomas | Dec. 23, 1941 |
| 2,306,382 | Fink | Dec. 29, 1942 |
| 2,827,077 | Mitchell | Mar. 18, 1958 |
| 2,836,189 | Holmes | May 27, 1958 |

FOREIGN PATENTS

| | | |
|---|---|---|
| 596,751 | Great Britain | Jan. 9, 1948 |